(12) United States Patent
Claxton et al.

(10) Patent No.: US 11,794,133 B2
(45) Date of Patent: Oct. 24, 2023

(54) SAND ELIMINATOR MEASUREMENT TANK

(71) Applicant: PEX Energy Services, LLC, Longview, TX (US)

(72) Inventors: Chase Claxton, Longview, TX (US); Susannah Claxton, Longview, TX (US)

(73) Assignee: PEX ENERGY SERVICES, LLC, Longview, TX (US)

( * ) Notice: Subject to any disclaimer, the term of this patent is extended or adjusted under 35 U.S.C. 154(b) by 478 days.

(21) Appl. No.: 16/571,479

(22) Filed: Sep. 16, 2019

(65) Prior Publication Data

US 2021/0077921 A1 Mar. 18, 2021

(51) Int. Cl.
*B01D 21/00* (2006.01)
*G01G 21/22* (2006.01)
*B01D 21/26* (2006.01)

(52) U.S. Cl.
CPC ....... *B01D 21/0012* (2013.01); *B01D 21/267* (2013.01); *G01G 21/22* (2013.01)

(58) Field of Classification Search
CPC ... B01D 21/0012; B01D 21/267; G01G 21/22
USPC .......................................................... 210/788
See application file for complete search history.

(56) References Cited

U.S. PATENT DOCUMENTS

| | | | | |
|---|---|---|---|---|
| 3,586,169 A * | 6/1971 | Hultquist | ........... | B01D 21/0012 210/90 |
| 3,698,555 A * | 10/1972 | Conner | ................. | B01D 29/60 210/138 |
| 3,910,364 A * | 10/1975 | Baker | .................. | G01G 19/021 177/145 |
| 5,487,603 A * | 1/1996 | Hoff | .................. | B01F 15/00253 222/58 |
| 6,146,530 A * | 11/2000 | Vollmer | ............. | B01D 21/0012 210/295 |
| 6,250,473 B1* | 6/2001 | Golightley | ............. | B03B 5/623 209/158 |
| 6,409,808 B1* | 6/2002 | Chamberlain | ..... | B01D 19/0057 96/182 |
| 8,967,673 B2* | 3/2015 | Morgan | .................... | B60P 3/24 280/837 |
| 9,297,246 B2* | 3/2016 | Smartt | .................. | E21B 21/067 |
| 2006/0104774 A1* | 5/2006 | Sessler | .................. | B65D 90/12 414/539 |
| 2008/0251469 A1* | 10/2008 | Tee | ........................ | B01D 45/16 210/788 |
| 2012/0080191 A1* | 4/2012 | Smartt | ............... | B01D 21/0012 166/308.1 |
| 2012/0292235 A1* | 11/2012 | Fink | ....................... | E03F 5/0404 210/90 |

(Continued)

*Primary Examiner* — Ekandra S. Miller-Cruz
(74) *Attorney, Agent, or Firm* — Nolte Lackenbach Siegel

(57) ABSTRACT

A tank system and methods of use for extracting sand and particulates from effluents, fluids, liquids, and muds are disclosed. The system uses pressure and cyclonic fluid dynamic based methods to extract, separate, weigh, and dump sand and particulates. The system comprises sand or particulate filtration or collection baskets that are hydraulically operated and scales that weigh the sand after separation from the fluidic component, prior to dumping. After separating the sands, the fluid is collected in a reservoir tank where it can be transported or removed from the site or otherwise disposed of as a liquid product.

8 Claims, 16 Drawing Sheets

(56) References Cited

U.S. PATENT DOCUMENTS

2015/0048033 A1* 2/2015 Burns .................. B01D 29/661
210/741
2015/0298031 A1* 10/2015 Crocker ................... B08B 3/02
210/335

* cited by examiner

SAND ELIMINATOR MEASUREMENT TANK

BACKGROUND

It is desirable in several industries, including the oil and gas industry, to separate sands and/or small particulates from fluidic components when the combined products are returned from the well bore.

SUMMARY

The sand eliminator measurement tank (hereinafter "tank") is valuable in gathering sand intake data for petroleum engineers. The tank's separation and removal of the solids from the liquids may be desirable as an overall cost saving method for cleaning the tanks. The use of the sand eliminator measurement tank limits personnel from having to have close contact with high pressure lines while dumping the well stream. The tank also lowers the opportunities for personnel to encounter or handle intake fracture sand, small particulates, and/or fluids.

The sand eliminator measurement tank system uses pressure, cyclonic flow, and hydraulics for automating the extraction of sand and granular products from effluent, fluids, liquids, and muds. The separation occurs through filtration where the sand is retained, and the fluids are allowed to flow-through into a reservoir. The system also comprises scales that weigh the sand after separation. Once separated, the system weighs the sands and then hydraulically deposits the sand and particulates into a dumpster or container. The dumpsters used for sand deposits are then able to present sand for samples or the sand can be properly disposed of without close contact to solids or costly measures for tank clean out. The system provides an efficient method of measuring and weighing sands from a fracture process such that the amount of sand returned can be more precisely and accurately calculated based on weight and percent recovery. After separation, the fluid or liquid is collected in the reservoir tank and may be transported or removed from the site or otherwise disposed of as a liquid product without significant particulate residue.

BRIEF DESCRIPTION OF THE DRAWINGS

The present disclosure is best understood from the following detailed description when read with the accompanying figures. It is emphasized that, in accordance with the standard practice in the industry, various features are not drawn to scale and may omit processes commonly performed in conjunction with the exemplary flow processes. The process flow diagrams are illustrative only and are provided in order to demonstrate the various features for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Figure 1:
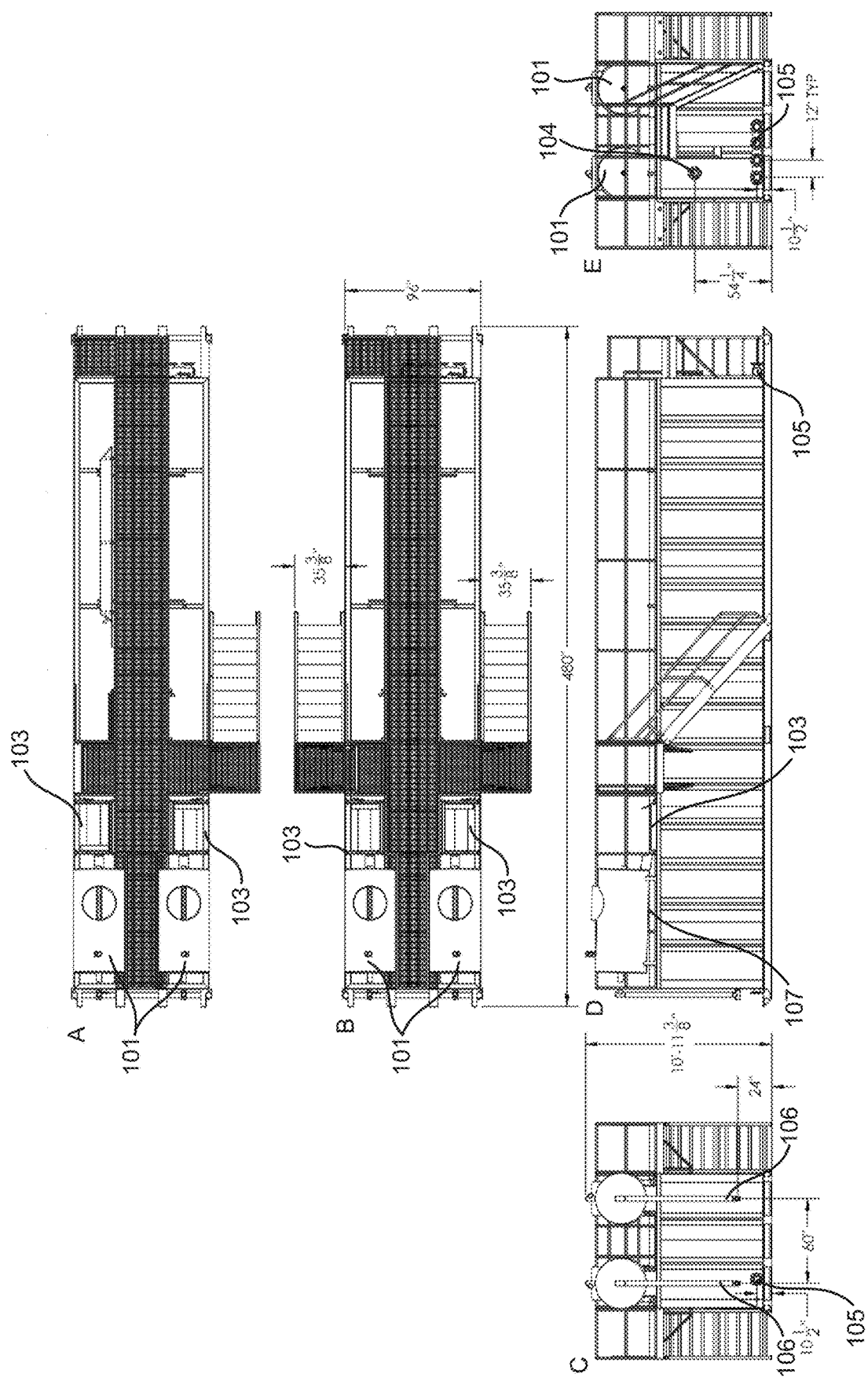
FIG. 1 is a plan, overview of the sand eliminator measurement tank.

FIG. 1 is an illustrative overview of the sand eliminator measurement tank. View A is top view showing two (dual) "buster" tanks 101 where the unseparated effluent enters the system through pipes 106 and flows through the system. The sands are separated then filtered and weighed in the baskets 103. View B provides a similar top view with exemplary dimensions for the tank system, which may be made larger or smaller. View C is an end-view illustrative of the system intake pipes and dual buster tanks. Exemplary dimensions are provided. View D is side view of the system showing the reservoir tank.

The buster tank 101 is shown on a declining angle indicated at 107. This configuration allows gravity to assist in the process and assists in the draining of the buster tanks 101. The placement of the sand basket collection system 103 is also shown in relation to the buster tanks 101. The reservoir tanks at the opposite end of the system are also shown with the fluid drains at 105. View E is the view of the tank at the opposite end of the buster tanks 101. The oil/gel line drain is shown at 104. Drains are shown at 105. Representations of dimensions are also indicated.

Figure 2:
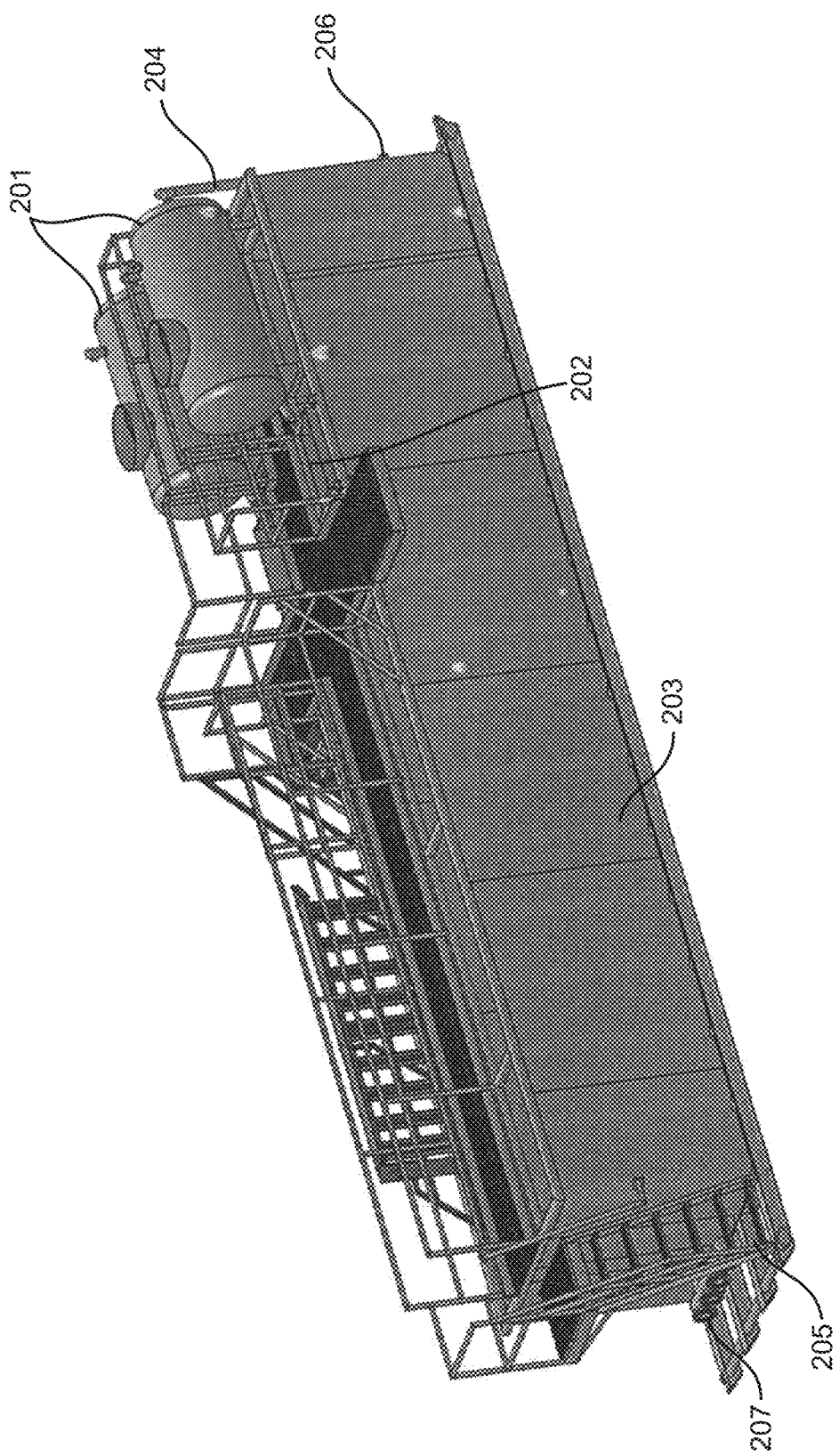
FIG. 2 is a perspective, side view of the sand eliminator measurement tank.

FIG. 2 is an illustrative view of the sand eliminator measurement tank. The dual separator "buster" tanks 201 are shown on top of the reservoir tank and located next to the hydraulically operated sand collection baskets 202 which are recessed in the top of the tank. The tanks 201 are positioned on an angle to enhance gravitational cyclonic action and draining. The reservoir tank 203 is located beneath the separator tanks. Intake lines 204 that join the separator tanks are positioned to provide the greatest degree of pressurized inflow 206. At the opposite end of the tank a ladder 205 is provided to access the top of the tank. Drain valves 207 are also positioned at the opposite end of the reservoir tank.

Figure 3:
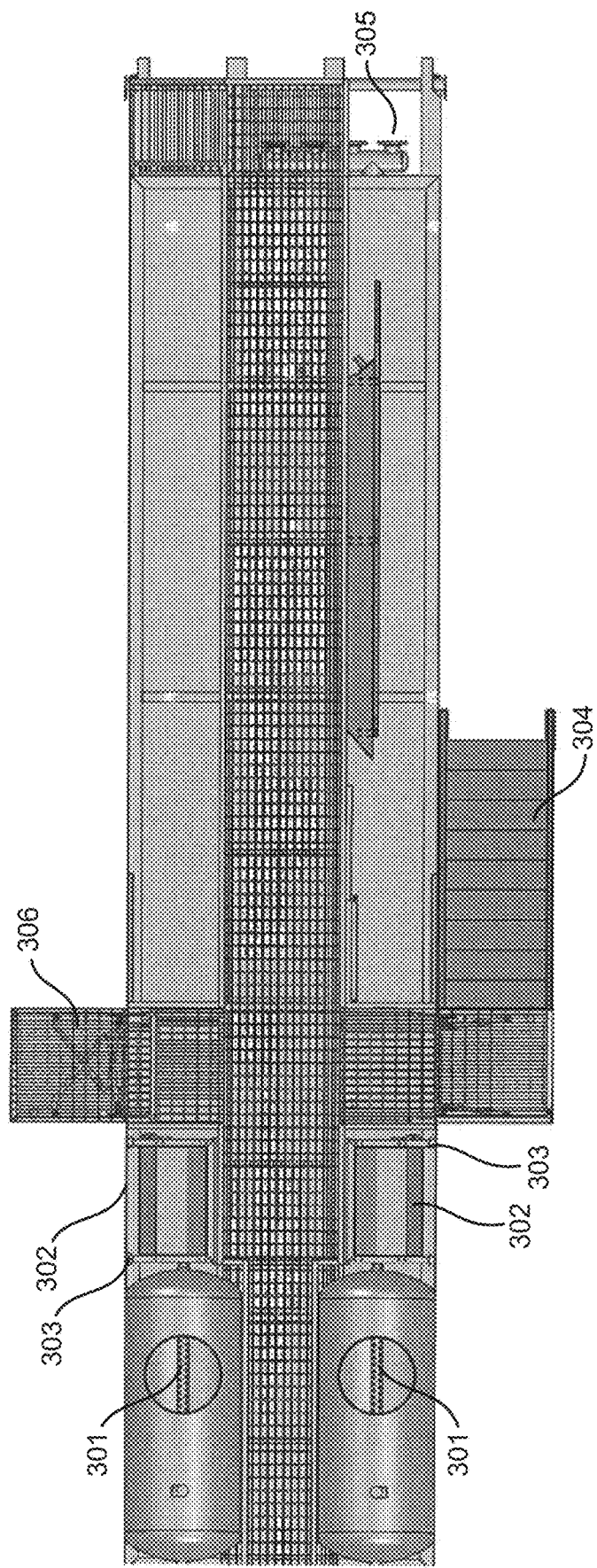
FIG. 3 is a top view of the tank where the grated walkways are shown.

FIG. 3 is an illustrative top view of the tank where the grated walkways are shown. The interior of the dual separator buster tanks is shown with a view of the perforated intake pipes inside of the separator buster tanks 301. These perforations increase the pressure of the effluent as it flows into the separator buster tanks. These structures combine with the interior shape of the separator buster tank to enhance cyclonic flow, which is important in the separation process. The flow is then directed to the separation baskets 302 which may utilize hydraulics, pneumatics, electrical or mechanical movement components attached to the frame 303 to raise the recessed baskets to dump the sand. The weight measurement components and scales are also located on the separation baskets 302. The weight measurement scales or readout may be located positionally on the side or the end of the reservoir tank or the weight may be reported remotely. Multiple walkways 306 and ladders 304 are shown that are foldable for transport. Foldable ladders 304 are also indicated. Outflow valves for draining the reservoir tank are shown as 305.

Figure 4:
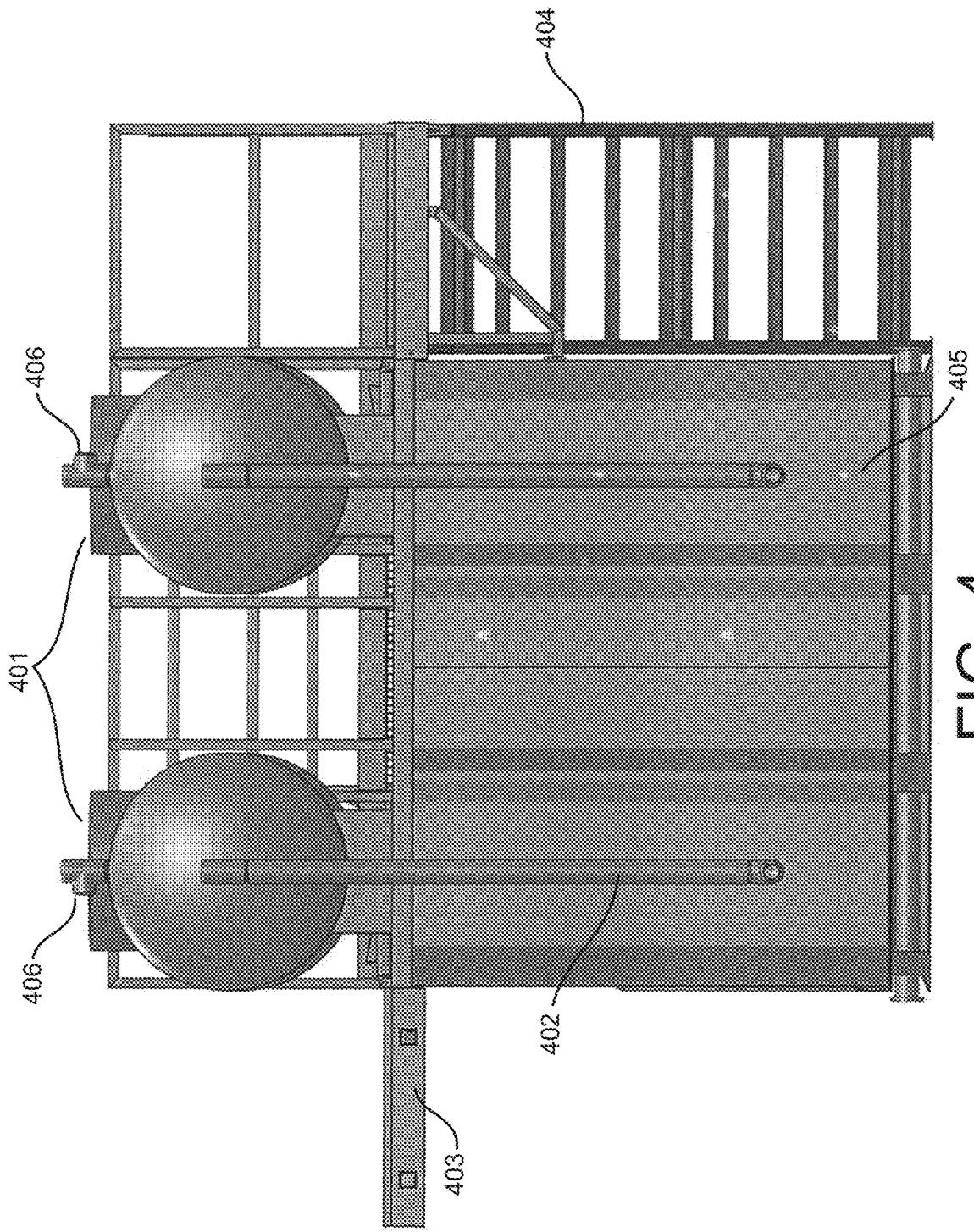
FIG. 4 is view of the intake side of the sand eliminator tank.

FIG. 4 is an illustrative view of the intake side of the tank. Dual separator tanks ("buster" tanks) 401 are shown. Optional flares or vents are also shown as 406. Separator inflow lines are shown at 402. Walkways 403 and ladders 404 are shown that are foldable for transport. The reservoir tank where the separated fluid is stored on a temporary basis is shown as 405.

Figure 5:
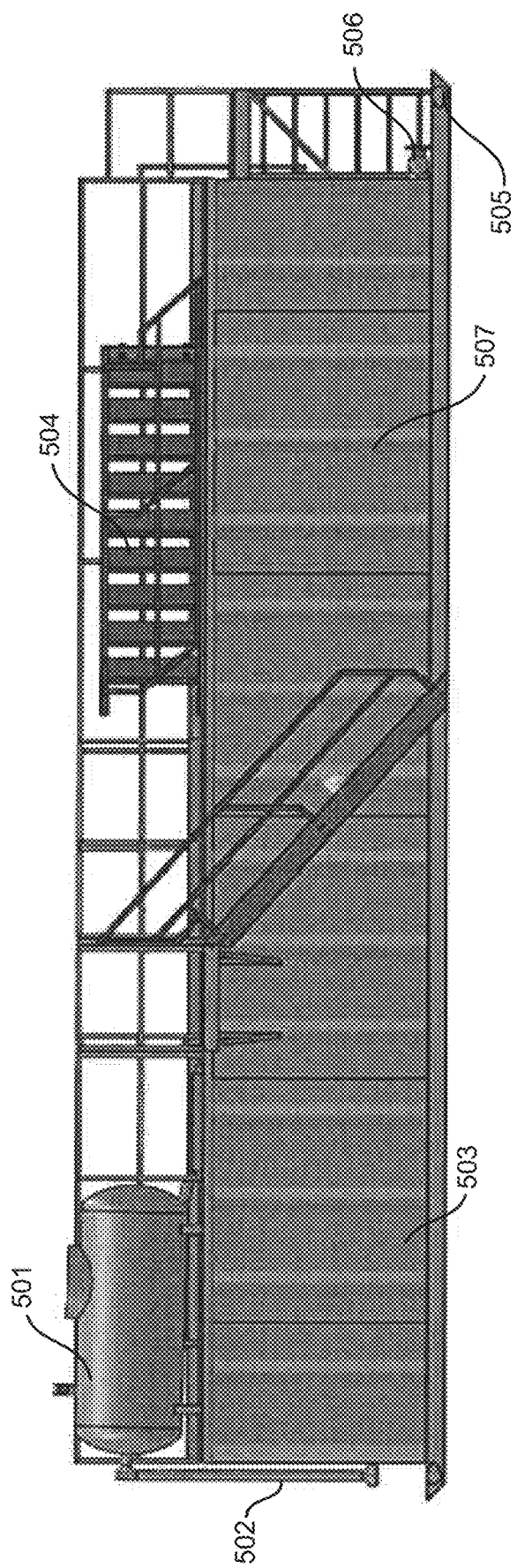
FIG. 5 is a side view of the sand eliminator tank illustrating a separator tank supplied by intake lines.

FIG. 5 is an illustrative of a side view of the tank 501 and illustrates a separator tank supplied by intake lines 502. The reservoir tank into which separated fluids drain is shown at 503. Foldable ladders are illustrated at 504. Skids supporting the tank are shown at 505. Reservoir drain valves are shown at 506. Electronic and mechanical control panel(s), and scale output panel(s) may be located anywhere on the reservoir tank 507. See also, FIG. 15.

Figure 6:
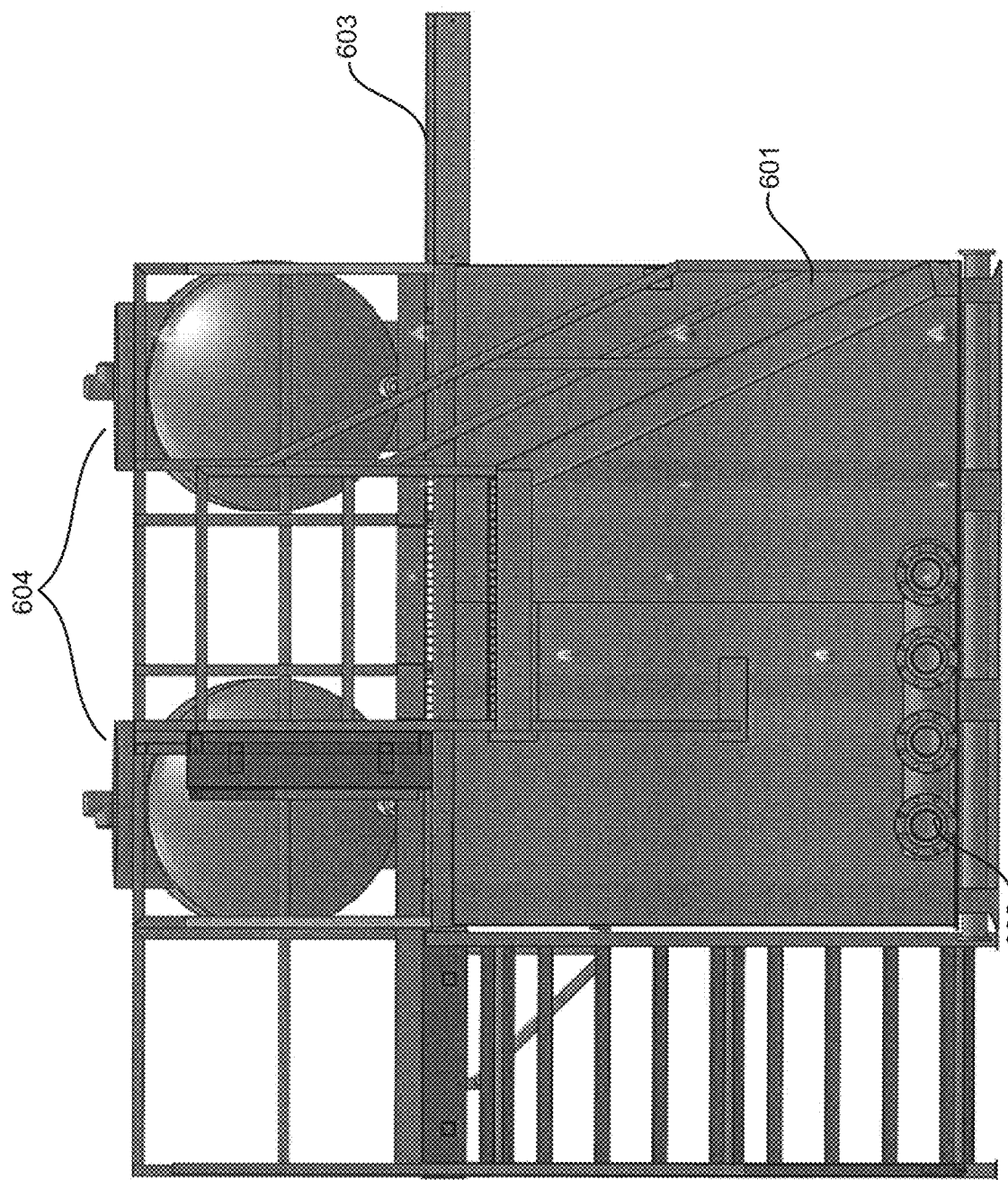
FIG. 6 is an illustrative end view of the sand eliminator tank opposite of the separator buster tanks.

FIG. 6 is an illustrative end view of the tank opposite the separator buster tanks 604. A ladder to access the components on the top of the reservoir tank is shown at 601. Similarly, foldable walkways and retractable rails that may permit personnel movement from one tank to another, should multiple rows of tanks be positioned next to one another, are shown at 603. Reservoir tank drain valves are shown at 602. Electronics, batteries, wires, and mechanical control panel(s), and scale output panel(s) located in explosion proof and non-explosion proof containers, including Class I DIV containers, may be located anywhere on the reservoir tank.

Figure 7:
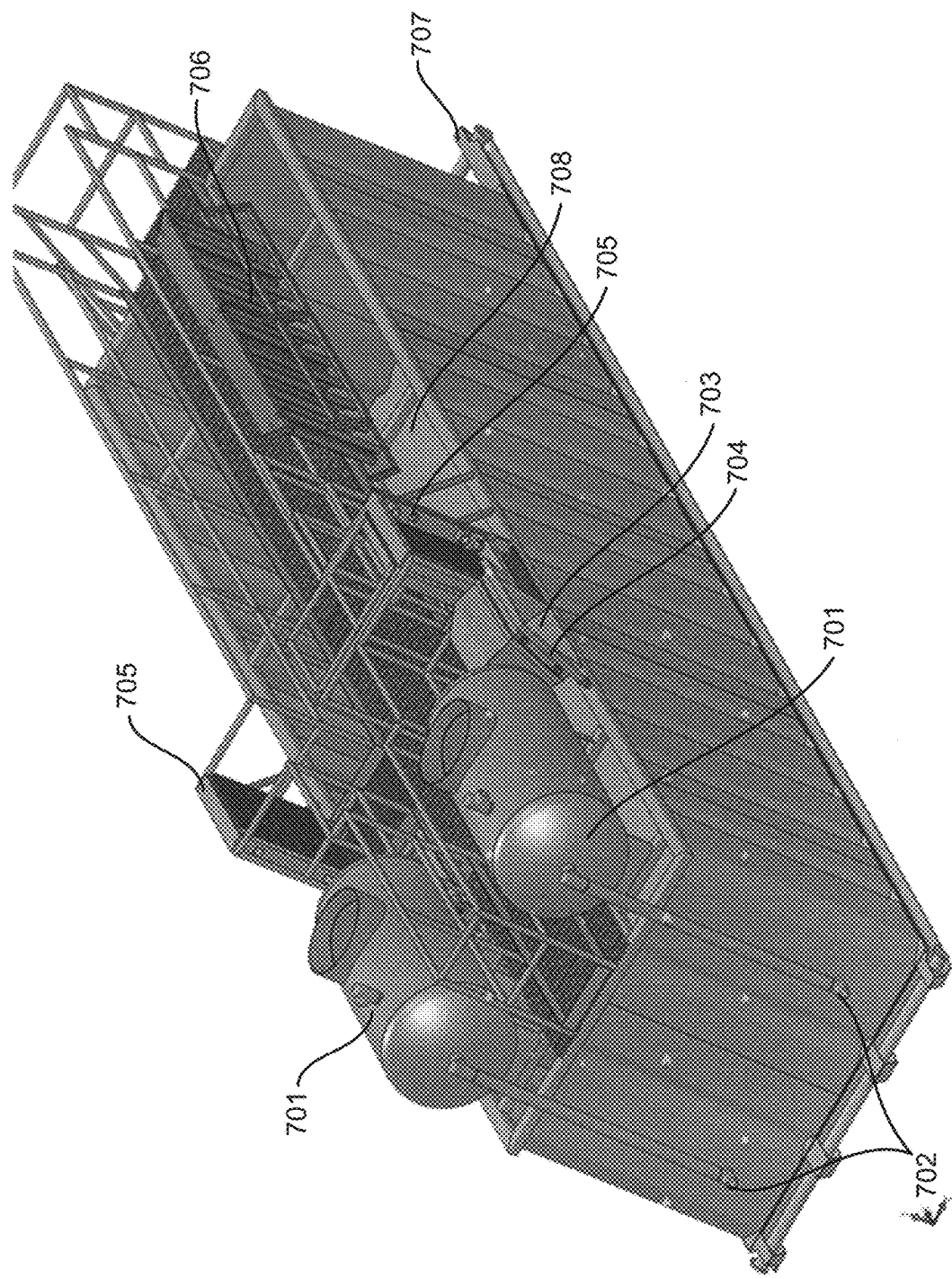
FIG. 7 is an illustrative of a top angle of the and eliminator tank.

FIG. 7 is an illustrative top angle of the tank. The separator buster tanks are shown at 701. Intake lines are shown at 702. One of the recessed sand separator filtration baskets or containers is shown at 703 in the upright "dump" position. The hydraulic components for the sand filtration separator baskets or containers are shown on the frame at 704. Foldable walkways 705 for ladders 706 or tank-to-tank connecting walkways are shown. Foundational skids for the tank to provide benefit for placement and movement are shown at 707. The interior of the fluid reservoir tank is also shown at 708.

Figure 8:
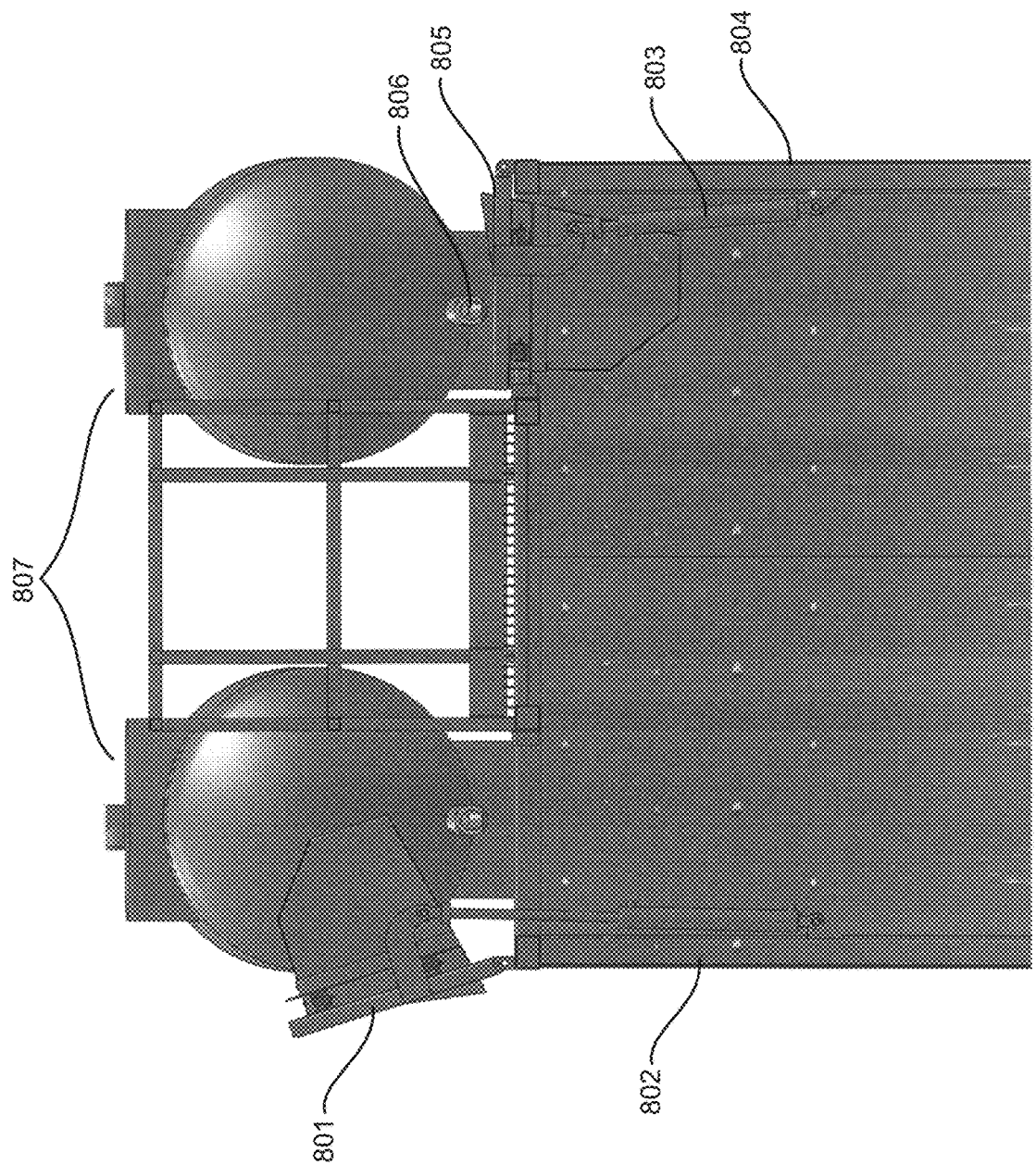
FIG. 8 is an illustrative, cut-away view of the sand eliminator tank with the open fluidic reservoir tank with the recessed sand filtration/separation dump baskets in the recessed position and the hydraulically elevated "dump" position, and the sand filtration/separation basket hydraulics.

FIG. 8 is an illustrative cut-away view of the tank 804 with the open fluidic reservoir tank 802 with the recessed sand filtration/separation dump baskets in the recessed position 805 and the hydraulically elevated "dump" position 801, and the sand filtration/separation basket hydraulics 803. A pressured post-cyclonic drain line that may vary in size (from 1" to 8" pipe) moves the pressurized effluent, alternatively at a declining angle, into the sand filtration/separation baskets is shown at 806.

Figure 9:
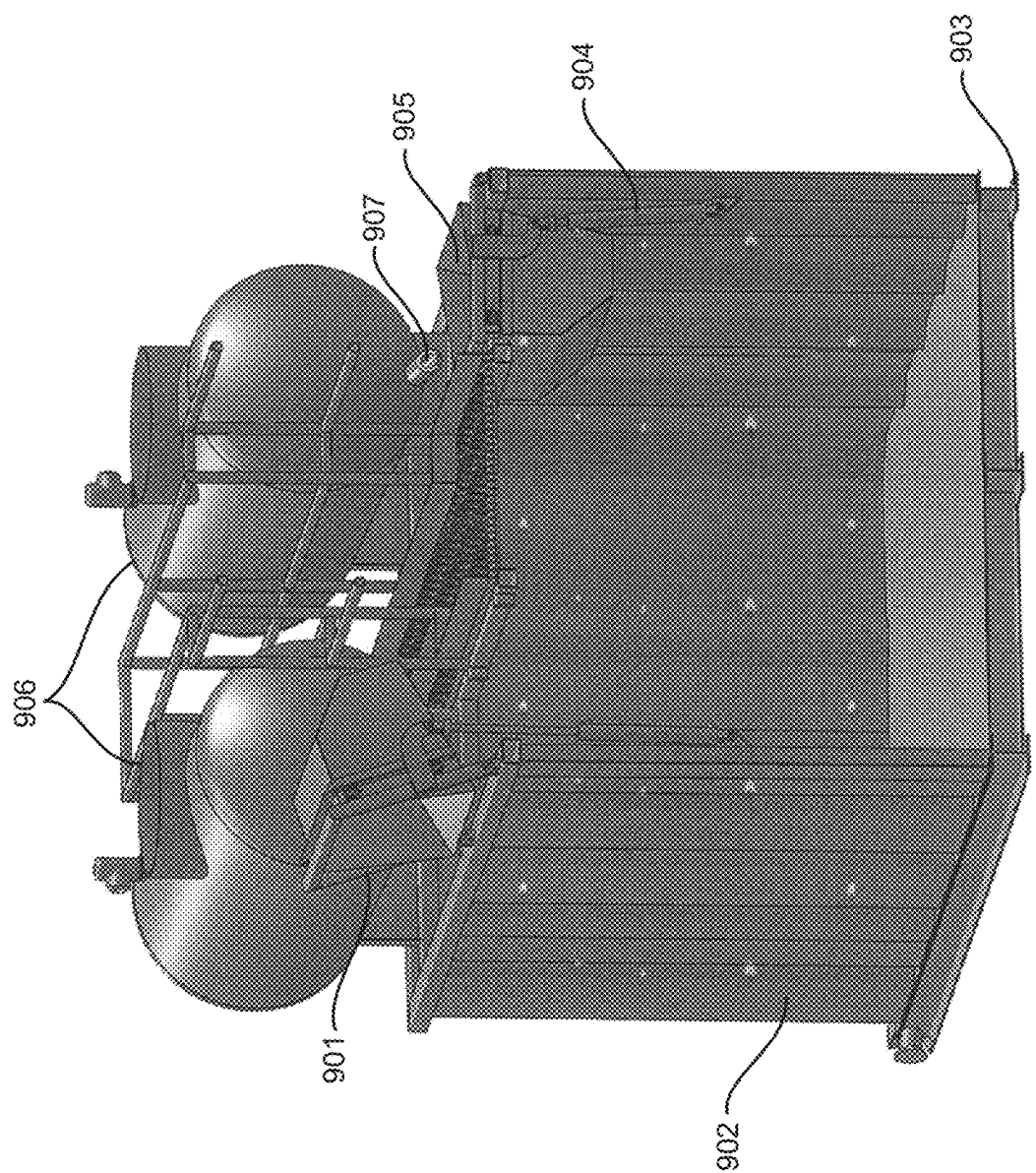
FIG. 9 is an illustrative cut-away view of the sand eliminator tank shown with the skids located beneath the sand eliminator tank.

FIG. 9 is an illustrative cut-away view of the tank 902 shown with the skids 903 located beneath the tank. Dual separator buster tanks are shown at 906. The sand retention basket in an elevated "dump" position is demonstrated at 901. A recessed sand basket is shown at 905. A pressurized post-cyclonic drain line that moves the pressurized effluent into the sand filtration/separation baskets is shown at 907. The sand basket hydraulic components are exemplified at 904.

Figure 10:
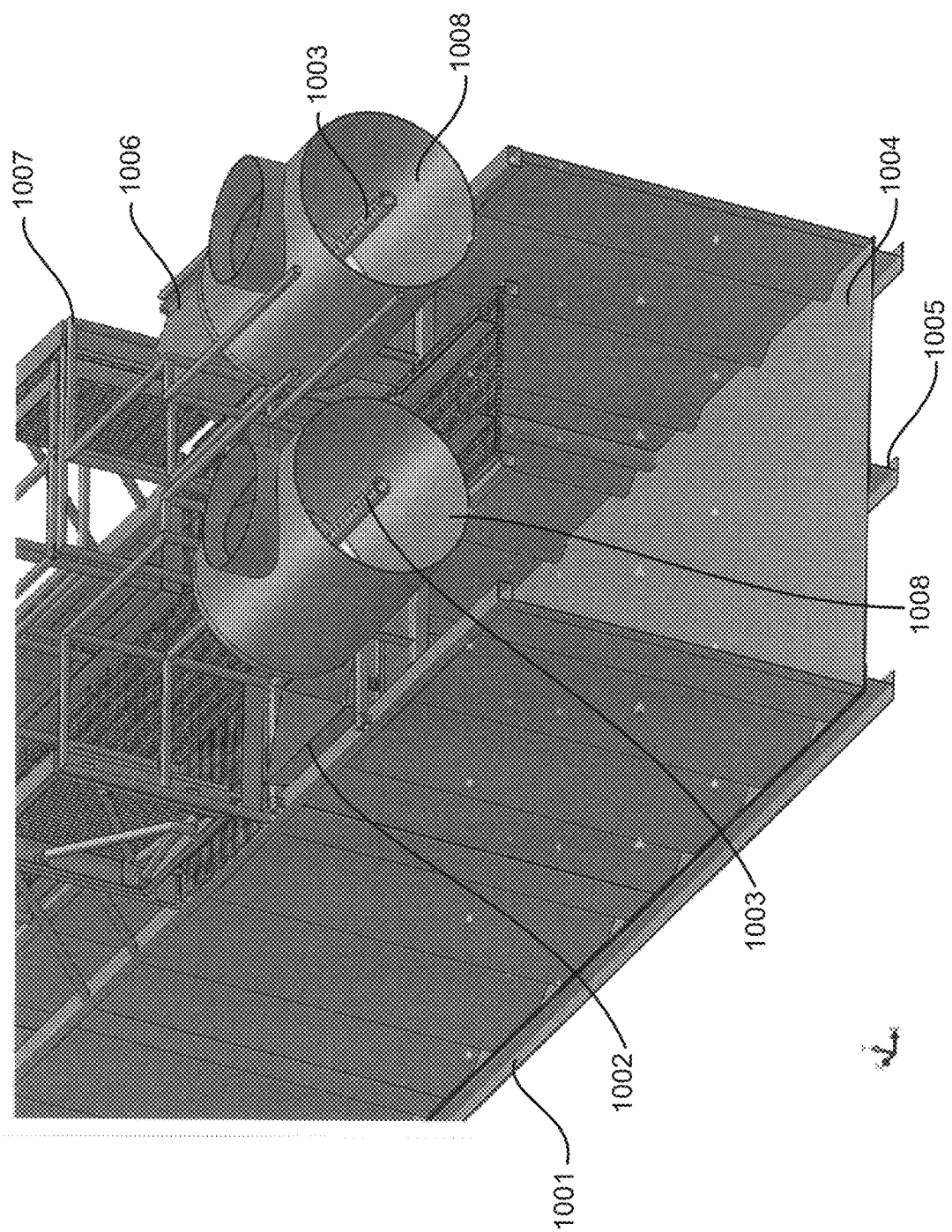
FIG. 10 is an illustrative, cut-away view of the separator buster tank inlet of the whole tank system.

FIG. 10 is an illustrative cut-away view of the separator buster tank inlet of the whole tank system. Exterior rail skids are shown at 1001. Interior rail support skids are shown at 1005. Interior floor of the fluid reservoir tank is shown at 1004. Recessed sand filtration/separation basket is shown at 1002. Sand filtration/separation basket in an elevated "dump" position is shown at 1006. Foldable walkways and ladders are indicated at 1007. The interior of the separator buster tanks is shown at 1008. The perforated intake pipes inside of the separator buster tanks are shown at 1003.

Figure 11:
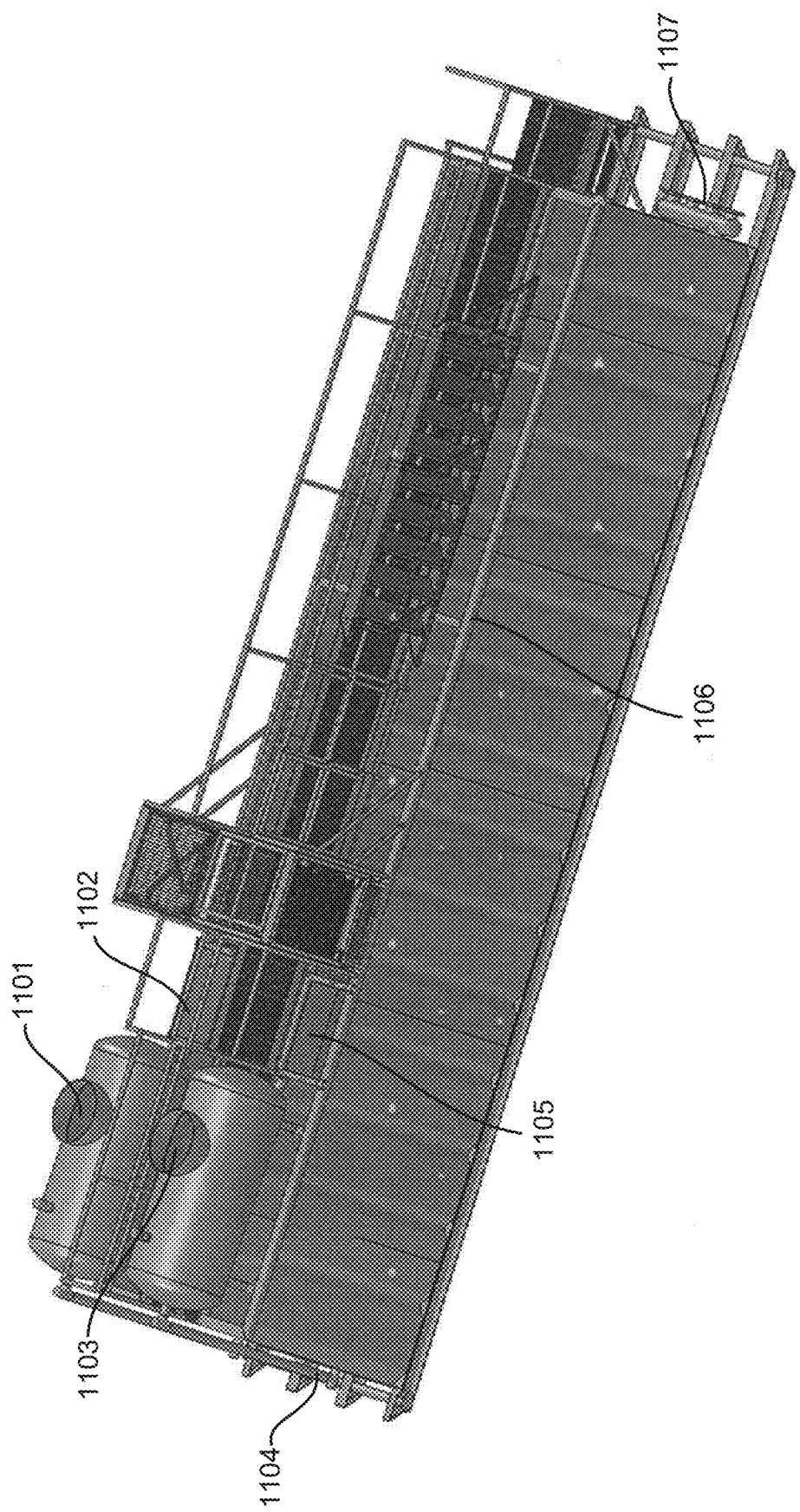
FIG. 11 is an illustrative, angled overview of the tank system.

FIG. 11 is an illustrative angled overview of the tank system. Manway clean out/inspection hatches for the buster separator tanks is shown at 1101 intake lines connected to the separator buster tank indicated at 1103. Separator baskets with scales are shown at 1102 and 1104. These baskets 1102 and 1104 may be elevated or recessed and may be emptied concurrently, sequentially, or separately using hydraulic, pneumatic, electric, or manual components. Drain valves for the reservoir tanks are shown at 1106. Manway clean out/inspection hatches for one of the two present buster separator tanks is shown at 1101.

Figure 12:
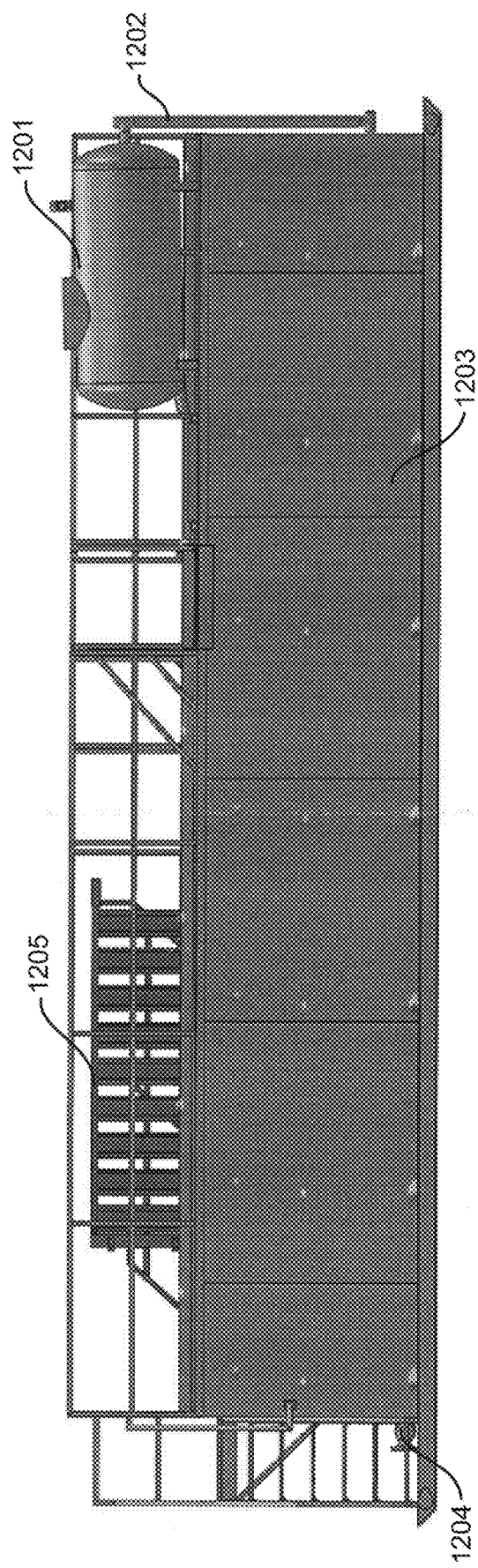
FIG. 12 is an illustrative, side view of the tank system.

FIG. 12 is an illustrative side view of the tank system. The reservoir tank is indicated at 1203. An elevated separator buster tank is indicated at 1201. Intake lines are shown at 1202. Drain valves for the reservoir tanks are indicated at 1204. Retractable and foldable ladders are indicated at 1205.

Figure 13:
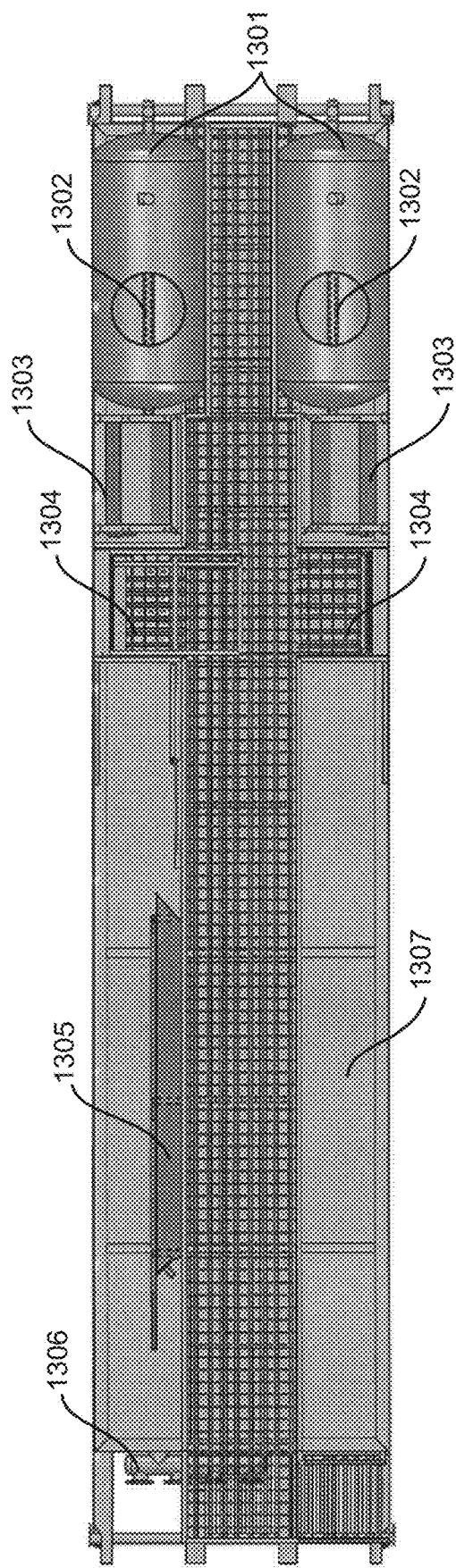
FIG. 13 is an illustrative, top view of the tank system.

FIG. 13 is an illustrative top view of the tank system. Dual sand separator buster tanks are shown at 1301. Perforated pipes 1302 interior to the sand separator buster tanks provide increased pressure and contribute to the function of cyclonic flow interior to the separator buster tanks. Dual sand separator baskets with scales and hydraulic components are shown at 1303. Retractable and foldable walkways 1304 and ladders 1305 are also shown. Drain valves for the reservoir tank is shown at 1306. The interior of the reservoir tank is shown at 1307.

Figure 14:
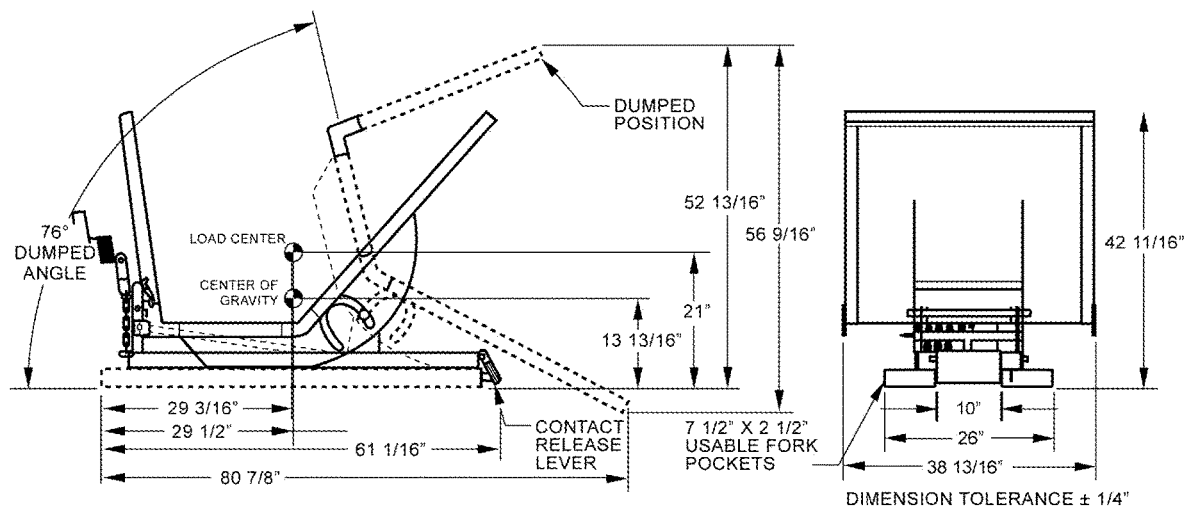
FIG. 14 is an illustrative view of a commercially available, prior art, side collection "dumpster" that may be used to collect the sand from the hydraulically operated sand separator basket after collection and weighing.

FIG. 14 is an illustrative view of a commercially available, prior art, side collection "dumpster" that may be used to collect the sand from the hydraulically operated sand separator basket after collection and weighing. Any generic dumpster basket may be used. The shown dumpster is beneficial because it has a side-dumpster feature. Exemplary dimensions are shown.

Figure 15:
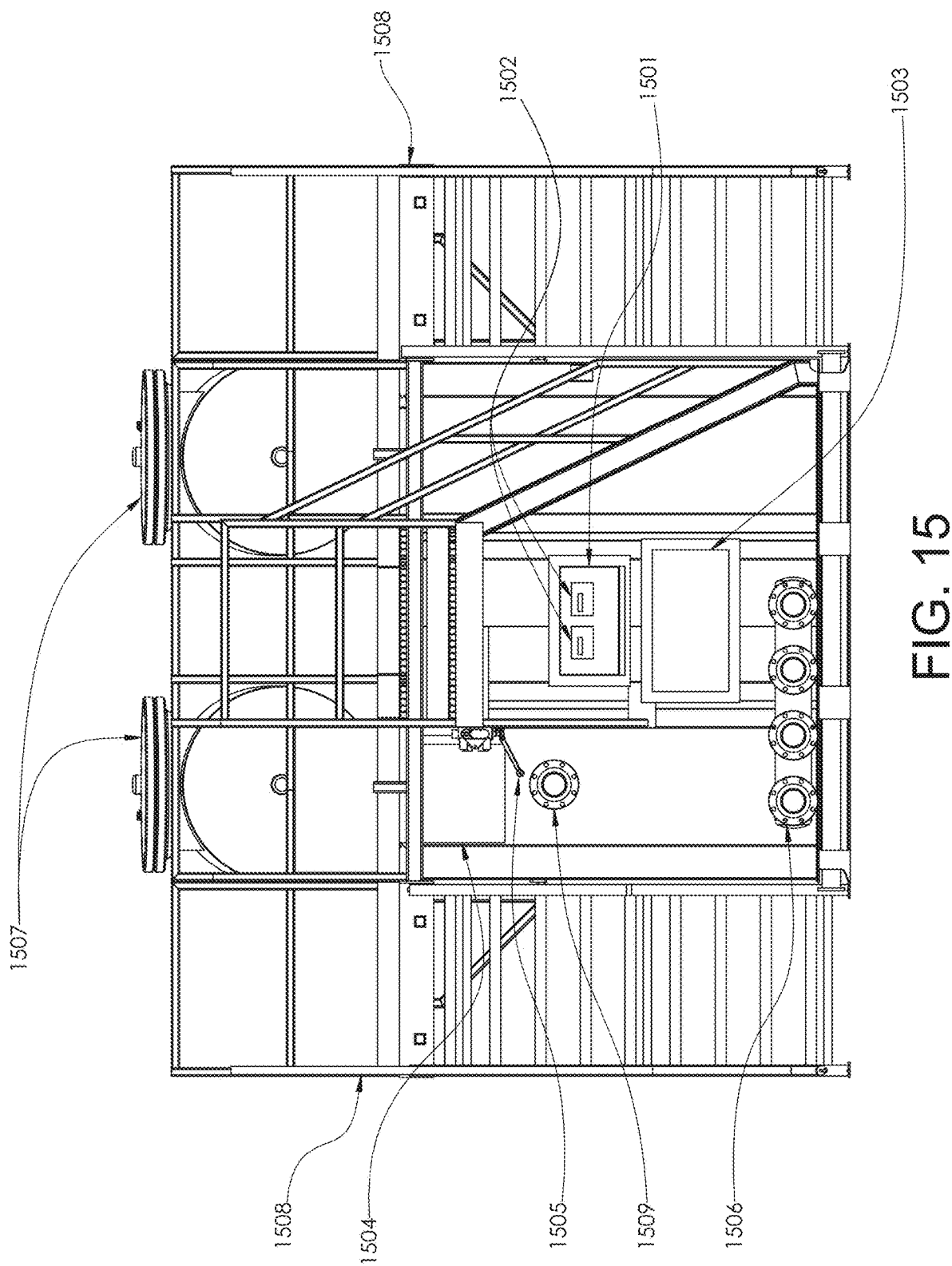
FIG. 15 is an illustrative of the end of the tank opposite the two buster tanks.

FIG. 15 is an illustrative of the end of the tank opposite the two buster tanks. 1501 is an illustrative positioning of the housing and controllers for the weight scales. 1502 is illustrative of the scale monitors. 1503 is illustrative of the hydraulic pump monitor. 1504 is illustrative of a cross-section showing the location of the hydraulic fluid reservoir tank. 1505 is illustrative of a manual or mechanical lever for hydraulics of the basket lift system. 1506 is illustrative of the drain valves. 1507 is illustrative of the buster tanks. 1508 is illustrative of the railings and stairs. 1509 is illustrative of an oil/gel drain valve.

Figure 16:
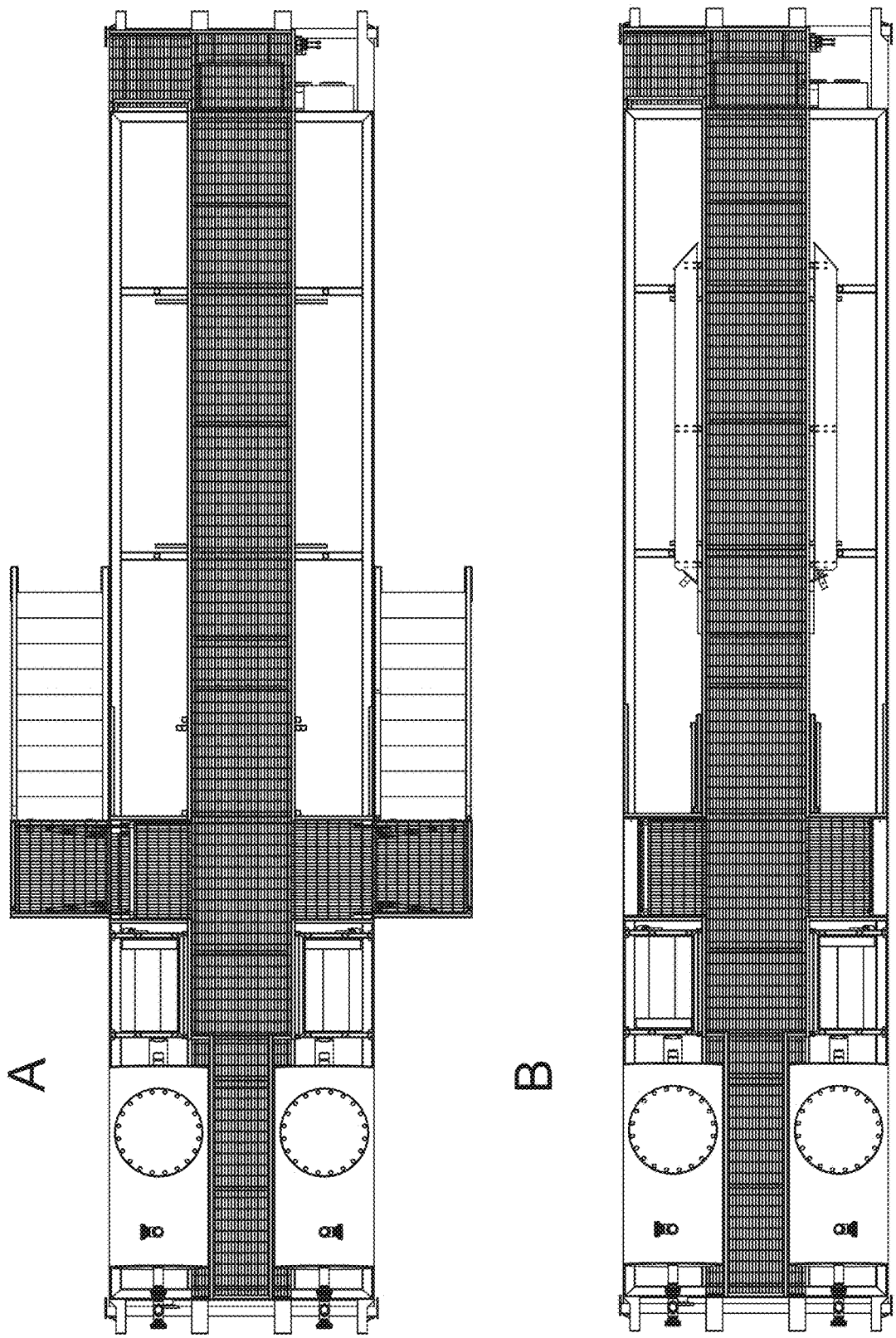
FIG. 16 is an enlarged version of FIG. 1, view A.

FIG. 16 is an enlarged version of FIG. 1, view A, but showing both the fully extended A and folded B side railings, stairs, and ladder components. The control levers and mechanisms are also shown on the tank positioned opposite from the buster tanks.

This invention utilizes methods and systems for automating the extraction of sand and small granular products from effluents, fluids, liquids, and muds. The system uses pressure, including but not limited to flow through pipes and in some embodiments, perforated pipes, and cyclonic fluid dynamic-based methods to extract and separate sands from fluids. The system also comprises scales that weigh the sand after extraction, prior to dumping, so that the amount of sand extracted may be measured and calculated. After separating the sands, the fluid or liquid is collected in a reservoir tank where it can be transported or removed from the site or otherwise disposed of as a liquid product without significant particulate residue.

Fluid or effluent is received in the system through intake lines. The fluid or effluent is received under pressure and is transported into one or more separator "buster" tanks. The intake lines internal to the separator tank are perforated such that pressure is increased inside the tanks. Additionally, the shape of the separator tanks is functional in that the combination of the internal shape of the tank and the perforated intake pipes generate a convectional cyclonic motion to assist in the separation of the fluidic portion from the sand(y) portion of the materials to be separated.

The pipes, including intake lines, may be sized from about 2", 3", 4", 5", or 6" as an example. The perforations on the pipes internal to the separator buster tanks may range from about 0.25" to about 0.5" to about 1" to about 1.5" to about 2". The separator buster tank drain line may range in size from about 1" to about 12". The reservoir tank drain valves or lines may be sized from about 1", 2", 3", 4", 5", 6", 7", 8", 9", 10", 11", or 12" or stepped-sizes to include sixteenths, eights, quarter, half, three-quarter sizes, and in any inner- or outer diameter within the range of 1" to 12" or larger, by way of example.

Once the effluent is released from the separator "buster" tank(s) it is passed through a filtration/separation dump basket. The filtration/separation dump basket may be lined with a sand filter material as a filtration system. The filtration/separation dump baskets may also comprise perforations of various sizes to act as size exclusion filtration mechanisms to prevent sands and small particulate matter from passing through while still permitting fluids to move through. The sand filter material is commonly made with the mesh or felt or a polyester or a combination thereof material fitted to the dimensions of the filtration/separation dump basket and secured to hooks on the separator/filter dump basket and tightened with a drawstring. The sand filter materials are replaced as needed. The filters may be measured in microns. This micron measurement gives a variation of flow for the fluids. For example, 100 micron will restrict fluid flow more than a 600 micron. 100 micron is finer than the 600 micron. Holes in the mesh may typically be measured in microns. The higher the number, the larger hole size. 100 micron mesh holes are 0.003925" compared to 600 micron mesh which are 0.023550". 400 micron mesh comprises 0.015700" holes and 200 micron mesh comprises 0.007850" holes. The filter material holes or micron rating will vary based on the grade of sand and flow from each well. The types of materials are not limited to any certain types of materials, fabrics, ropes, or meshes that could be used as a filter material in this process such examples are as followed but are not limited to cottons, felts, polyesters, plastics, polymers, elastics, metallics, composites, or combinations thereof.

The separator baskets also comprise scales that may be mechanical or electronic. These scales weigh the sand prior to engaging a hydraulic system to dump the sand into a dumpster or other container. The scale readout or weight reporting mechanism may be located on the basket, next to the basket, or provided on another surface of the tank system. The readout or weight reporting mechanism may also be transmitted electronically to a processor on another part of the system tank or it may be transmitted wirelessly to a remote location. The scales may be rated for 500, 1000, 1500, 2000, 2500, 3000, 3500, 4000, 4500, 5000, 5500, or 6000 pounds of sand or any range therein or alternatively rated for a range that is reasonably scaled to the size of the tank as appreciated by one of ordinary skill in the art.

Once the sand has been weighed, the hydraulics on the basket may be engaged to raise and tilt the basket to dump the sand into a dumpster, hopper, or other container provided alongside of the system tank.

Walkways, ladders, and stairs are provided that may be retracted or folded for transport and setup onsite.

The tank system may also comprise computerized controllers and electronic processors, including explosion proof electronic systems that engage system components, including but not limited to the hydraulic system.

The tank system may also comprise voltage controllers, batteries, and or outlets that operate on 110V or 220V or another voltage that is capable of operating the electronic components attached to or appurtenant to the tank systems. The tank system may be supplied with power by an internal or external power supply and it may be direct or indirect and it may encompass solar, wind, generator, or battery power. Power adapters are also contemplated and are encompassed within the tank system.

The tank system may also comprise a backflow preventer or one or more check valves that may be positioned at any location in the system.

The foregoing description, for the purpose of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this closure be defined by the claims and their equivalents below.

We claim:

1. The sand eliminator measurement tank, comprising: an intake pipe or line; an enclosed separator tank to receive under an input pressure a wellbore mixture of particulates and fluids from the intake pipe or line, the enclosed separator tank: receiving the wellbore mixture from the intake pipe or line, having an internal shape, and including an internal perforated pipe through which the wellbore mixture flows to decrease pressure relative to the input pressure and to induce, in conjunction with the internal shape, a cyclonic fluidic action to assist in separating the particulates from the fluids; one or more particulate filtration baskets or containers to: receive from the enclosed separator tank the wellbore mixture of particulates and fluids in which the cyclonic fluidic action has been imparted; and separate the particulates from the fluids; a reservoir tank atop which the enclosed separator tank is affixed and to which the one or more particulate filtration baskets or containers are attached, the reservoir tank to collect separated fluids from the one or more particulate filtration baskets or containers; outflow pipes, lines, or drains affixed to the reservoir tank to drain the collected, separated fluid; and at least one scale associated with the one or more particulate filtration baskets or containers to weigh the separated particulates.

2. The sand eliminator measurement tank of claim 1, wherein the internal shape of the enclosed separator tank is cylindrical.

3. The sand eliminator measurement tank of claim 1, wherein the one or more particulate filtration baskets or containers comprise hydraulic actuators to raise and lower the one or more particulate filtration baskets or containers to dump the separated particulates.

4. The sand eliminator measurement tank of claim 1, wherein the one or more particulate filtration baskets or containers are lined with a material with openings from 100 microns to 600 microns.

5. The sand eliminator measurement tank of claim 1, wherein the at least one scale is rated up to 6,000 pounds.

6. The sand eliminator measurement tank of claim 1, wherein the one or more particulate filtration baskets or containers are:
  recessed in the top of the reservoir tank; and
  positioned on a declining angle to enhance gravitational cyclonic action.

7. The sand eliminator measurement tank of claim 1, further comprising a backflow preventer or one or more check valves.

8. The sand eliminator measurement tank method of claim 1, wherein: the intake pipe or line is one of a plurality of intake pipes or lines; the enclosed separator tank is one of a plurality of enclosed separator tanks; and each of the enclosed separator tanks is to receive under the input pressure the wellbore mixture of particulates and fluids from one or more of the intake pipes or lines.

* * * * *